United States Patent
Franke et al.

(10) Patent No.: US 11,072,053 B2
(45) Date of Patent: Jul. 27, 2021

(54) METHODS OF MAKING METAL BOND AND VITREOUS BOND ABRASIVE ARTICLES, AND ABRASIVE ARTICLE PRECURSORS

(71) Applicant: 3M INNOVATIVE PROPERTIES COMPANY, St. Paul, MN (US)

(72) Inventors: Carsten Franke, St. Paul, MN (US); Maiken Givot, St. Paul, MN (US); Malte Korten, Moorenweis (DE); Robert L. W. Smithson, Mahtomedi, MN (US); Brian D. Goers, Minneapolis, MN (US); Negus B. Adefris, St. Paul, MN (US); Thomas J. Anderson, Cottage Grove, MN (US); Brian A. Shukla, Woodbury, MN (US); Michael C. Harper, Hudson, WI (US); Elizaveta Y. Plotnikov, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 16/070,316

(22) PCT Filed: Jan. 18, 2017

(86) PCT No.: PCT/US2017/013867
§ 371 (c)(1),
(2) Date: Jul. 16, 2018

(87) PCT Pub. No.: WO2017/127392
PCT Pub. Date: Jul. 27, 2017

(65) Prior Publication Data
US 2019/0022826 A1    Jan. 24, 2019

Related U.S. Application Data

(60) Provisional application No. 62/281,349, filed on Jan. 21, 2016, provisional application No. 62/315,044, filed on Mar. 30, 2016.

(51) Int. Cl.
*B24D 3/06* (2006.01)
*B22F 3/00* (2021.01)
(Continued)

(52) U.S. Cl.
CPC ............... *B24D 3/06* (2013.01); *B22F 3/008* (2013.01); *B22F 3/1055* (2013.01); *B24D 3/14* (2013.01);
(Continued)

(58) Field of Classification Search
CPC .......... B24D 3/06; B33Y 10/00; B33Y 70/00; B33Y 80/00; B29C 64/153
See application file for complete search history.

(56) References Cited

U.S. PATENT DOCUMENTS 2,367,404 A    1/1945    Kott
3,850,590 A    11/1974   Chalkley
(Continued)

FOREIGN PATENT DOCUMENTS

CN    1143923        2/1997
CN    102205524 A    10/2011
(Continued)

OTHER PUBLICATIONS

Maekawa, "Fabrication of Metal-Bonded Grinding/Polishing Tools by the Greentape Laser Sintering Method", Key Engineering Materials, Jan. 2001, vol. 196, pp. 133-140.
(Continued)

*Primary Examiner* — Nicholas A Wang
*Assistant Examiner* — Jiangtian Xu
(74) *Attorney, Agent, or Firm* — Katherine M. Scholz; Adrian L. Pishko

(57) ABSTRACT

The present disclosure provides methods of making a vitreous bond abrasive article and a metal bond abrasive article.
(Continued)

The methods include sequential steps. Step a) includes a subprocess including sequentially: i) depositing a layer of loose powder particles in a confined region; and ii) selectively applying heat via conduction or irradiation, to heat treat an area of the layer of loose powder particles. The loose powder particles include abrasive particles and organic compound particles, as well as vitreous bond precursor particles or metal particles. The layer of loose powder particles has substantially uniform thickness. Step b) includes independently carrying out step a) a number of times to generate an abrasive article preform comprising the bonded powder particles and remaining loose powder particles. Step c) includes separating remaining loose powder particles from the abrasive article preform. Step d) includes heating the abrasive article preform to provide the vitreous bond abrasive article comprising the abrasive particles retained in a vitreous bond material, or to provide the metal bond abrasive article. A method of making a metal bond abrasive optionally includes infusing an abrasive article preform with a molten lower melting metal and solidifying the molten lower melting metal to provide the metal bond abrasive article. The present disclosure further provides a vitreous bond abrasive article precursor and a metal bond abrasive article precursor.

10 Claims, 6 Drawing Sheets

(51) Int. Cl.
| | |
|---|---|
| *B22F 3/105* | (2006.01) |
| *B24D 3/14* | (2006.01) |
| *B24D 5/10* | (2006.01) |
| *B24D 7/10* | (2006.01) |
| *B33Y 80/00* | (2015.01) |
| *B33Y 10/00* | (2015.01) |
| *B33Y 70/00* | (2020.01) |
| *B29C 64/153* | (2017.01) |
| *B24D 18/00* | (2006.01) |

(52) U.S. Cl.
CPC ............ *B24D 5/10* (2013.01); *B24D 7/10* (2013.01); *B24D 18/00* (2013.01); *B24D 18/009* (2013.01); *B29C 64/153* (2017.08); *B33Y 10/00* (2014.12); *B33Y 70/00* (2014.12); *B33Y 80/00* (2014.12); *B22F 2998/10* (2013.01); *Y02P 10/25* (2015.11)

(56) References Cited

U.S. PATENT DOCUMENTS

| | | |
|---|---|---|
| 4,314,827 A | 2/1982 | Leitheiser |
| 4,518,397 A | 5/1985 | Leitheiser |
| 4,574,003 A | 3/1986 | Gerk |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 5,178,644 A | 1/1993 | Huzinec |
| 5,551,962 A | 9/1996 | Ho |
| 5,551,963 A | 9/1996 | Larmie |
| 5,552,225 A | 9/1996 | Ho |
| 5,745,834 A | 4/1998 | Bampton |
| 5,900,207 A | 5/1999 | Danforth |
| 6,086,648 A | 7/2000 | Rossetti |
| 6,551,366 B1 | 4/2003 | D'Souza |
| 6,858,050 B2 | 2/2005 | Palmgren |
| 2002/0095875 A1 | 7/2002 | D'Evelyn |
| 2002/0189405 A1 | 12/2002 | Liu |
| 2006/0019587 A1 | 1/2006 | Deopura |
| 2006/0185255 A1 | 8/2006 | Nevoret |
| 2006/0185256 A1* | 8/2006 | Nevoret ................ B24D 11/00 51/298 |
| 2006/0185257 A1 | 8/2006 | Nevoret |
| 2007/0031791 A1 | 2/2007 | Cinader, Jr. |
| 2009/0022826 A1 | 1/2009 | Franke |
| 2012/0201960 A1 | 8/2012 | Hartmann |
| 2013/0171416 A1 | 7/2013 | Diekmann |
| 2014/0287658 A1 | 9/2014 | Flaschberger |
| 2014/0298728 A1 | 10/2014 | Keshavan |
| 2015/0061170 A1 | 3/2015 | Engel |
| 2017/0342303 A1* | 11/2017 | Stevenson ............ C09K 3/1409 |

FOREIGN PATENT DOCUMENTS

| | | |
|---|---|---|
| CN | 202088120 | 12/2011 |
| CN | 202088120 U | 12/2011 |
| CN | 103264361 | 8/2013 |
| CN | 103264361 A | 8/2013 |
| CN | 103273432 A | 9/2013 |
| CN | 103781595 | 5/2014 |
| CN | 104440597 A | 3/2015 |
| CN | 105081992 A | 11/2015 |
| EP | 2488347 | 8/2012 |
| JP | H10-156737 | 6/1998 |
| JP | 2008-018479 | 1/2008 |
| PT | 107096 | 2/2015 |
| WO | 90-01397 | 2/1990 |
| WO | WO 97/13601 | 4/1997 |
| WO | 2002/045907 | 6/2002 |
| WO | 2006-091518 | 8/2006 |
| WO | 2006/091519 | 8/2006 |
| WO | WO 2016-209696 | 12/2016 |
| WO | WO 2016-210057 | 12/2016 |

OTHER PUBLICATIONS

International Search Report for PCT International Application No. PCT/US2017/013867, dated Jun. 19, 2017, 4 pages.
International Search Report for PCT International Application No. PCT/US2017/024882, dated May 16, 2017, 8 pages.
Zou, "Organic Abrasive Tool Manufacture", China Standard Press, Sep. 2001, 1$^{st}$ edition, pp. 246-248.

* cited by examiner

METHODS OF MAKING METAL BOND AND VITREOUS BOND ABRASIVE ARTICLES, AND ABRASIVE ARTICLE PRECURSORS

CROSS REFERENCE TO RELATED APPLICATIONS

This application is a national stage filing under 35 U.S.C. 371 of PCT/US2017/013867, filed Jan. 18, 2017, which claims the benefit of U.S. Application No. 62/281,349, filed Jan. 21, 2016 and U.S. Application No. 62/315,044, filed Mar. 30, 2016, the disclosures of which are incorporated by reference in their entirety herein.

TECHNICAL FIELD

The present disclosure broadly relates to methods of making abrasive articles having abrasive particles in a metallic bonding matrix or a vitreous bonding matrix.

BACKGROUND

Traditionally, vitrified bond abrasive articles (e.g., abrasive wheels, abrasive segments, and whetstones) are made by compressing a blend of abrasive particles (e.g., diamond, cubic boron nitride, alumina, or SiC), a vitreous bond precursor (e.g., glass frit, ceramic precursor) an optional pore inducer (e.g., glass bubbles, naphthalene, crushed coconut or walnut shells, or acrylic glass or PMMA), and a temporary organic binder in a liquid vehicle (e.g., aqueous solutions of phenolic resin, polyvinyl alcohol, urea-formaldehyde resin, or dextrin). The abrasive particles, vitreous bond precursor, and usually the pore inducer are typically dry blended together. The temporary organic binder solution is then added to wet out the grain mix. The blended mix is then placed in a hardened steel mold treated with a mold release. The filled mold is then compressed in a press to form a molded green body. The green body then is ejected from the mold, and subsequently heated until the temporary organic binder is burned out and the vitreous bond precursor is converted into a vitreous bond matrix (also referred to in the art as "vitreous bond" and "vitreous binder".

Traditionally, metal bond abrasive articles are made by mixing an abrasive grit, such as diamond, cubic boron nitride (cBN), or other abrasive grains with a non-melting metal powder (e.g., tungsten, stainless steel, or others), a melting metal powder (e.g., bronze or copper), or a combination thereof. Pore inducers, temporary binders and other additives may be added. The mixture is then introduced into a mold that has been coated with a mold release agent. The filled mold is then compressed in a press to form a molded green body. The green body then is ejected from the mold and subsequently heated in a furnace at high temperature to melt a portion of the metal composition, or it is infused with a molten metal. The heating is typically done in a suitable controlled atmosphere of inert or reducing gas (e.g., nitrogen, argon, hydrogen) or in a vacuum.

There are many disadvantages to these manufacturing approaches: each abrasive article shape requires a special mold; the molds typically are expensive and have a long lead time to make; any design change requires the manufacture of a new mold; there are limitations to the shapes that can be molded, complicated shapes with undercuts or internal structures such as cooling channels are generally not possible; molds wear out and have a limited number of units that can be manufactured per mold; while the molds are filled with the abrasive mixture, separation of the components can occur, leading to inhomogeneous abrasive components and density variation, which is easily visible and may cause performance variations. Moreover, the processes are often manual and labor intensive.

In selective laser sintering, a layer of powder comprising a metal powder and an abrasive grain is spread in a uniform layer in an inert atmosphere enclosure. In predetermined areas, the powder is heated by a laser beam to heat the metal powder to its sintering temperature. A disadvantage of traditional laser sintering is that a high powered laser is required (e.g., in the range of 30-150 watts) and that the inert atmosphere needs to be maintained throughout the printing process.

SUMMARY

In a first aspect, the present disclosure provides a method of making a vitreous bond abrasive article, the method including sequential steps. Step a) includes a subprocess including sequentially: i) depositing a layer of loose powder particles in a confined region; and ii) selectively applying heat via conduction or irradiation, to heat treat an area of the layer of loose powder particles. The loose powder particles include vitreous bond precursor particles, abrasive particles, and organic compound particles. The layer of loose powder particles has substantially uniform thickness. Step b) includes independently carrying out step a) a plurality of times to generate an abrasive article preform comprising the bonded powder particles and remaining loose powder particles. In each step a), the loose powder particles are independently selected. Step c) includes separating substantially all of the remaining loose powder particles from the abrasive article preform; and step d) includes heating the abrasive article preform to provide the vitreous bond abrasive article comprising the abrasive particles retained in a vitreous bond material.

In a second aspect, the present disclosure provides a vitreous bond abrasive article precursor including abrasive particles bonded together by a vitreous bond precursor material and an organic compound, wherein the vitreous bond abrasive article precursor further includes at least one of at least one tortuous cooling channel extending at least partially through the vitreous bond abrasive article precursor; or at least one arcuate cooling channel extending at least partially through the vitreous bond abrasive article precursor.

In a third aspect, the present disclosure provides a method of making a metal bond abrasive article, the method comprising sequential steps. Step a) includes a subprocess including sequentially: i) depositing a layer of loose powder particles in a confined region; and ii) selectively applying heat via conduction or irradiation, to heat treat an area of the layer of loose powder particles. The loose powder particles include higher melting metal particles, abrasive particles, and organic compound particles. The layer of loose powder particles has substantially uniform thickness. Step b) includes independently carrying out step a) a plurality of times to generate an abrasive article preform comprising the bonded powder particles and remaining loose powder particles. In each step a), the loose powder particles are independently selected. Step c) includes separating substantially all of the remaining loose powder particles from the abrasive article preform. Step d) includes infusing the abrasive article preform with a molten lower melting metal, wherein at least some of the higher melting metal particles do not completely melt when contacted by the molten lower melting metal.

Step e) includes solidifying the molten lower melting metal to provide the metal bond abrasive article.

In a fourth aspect, the present disclosure provides a method of making a metal bond abrasive article, the method including sequential steps. Step a) includes a subprocess including sequentially: i) depositing a layer of loose powder particles in a confined region; and ii) selectively applying heat via conduction or irradiation, to heat treat an area of the layer of loose powder particles. The loose powder particles include metal particles, abrasive particles, and organic compound particles. The layer of loose powder particles has substantially uniform thickness. Step includes b) independently carrying out step a) a plurality of times to generate an abrasive article preform comprising the bonded powder particles and remaining loose powder particles, wherein the abrasive article preform has a predetermined shape. In each step a), the loose powder particles are independently selected. Step c) includes separating substantially all of the remaining loose powder particles from the abrasive article preform. Step d) includes heating the abrasive article preform to provide the metal bond abrasive article.

In a fifth aspect, the present disclosure provides a metal bond abrasive article precursor including metallic particles and abrasive particles bonded together by an organic compound material, wherein the metal bond abrasive article precursor further includes at least one of: at least one tortuous cooling channel extending at least partially through the metal bond abrasive article precursor; and at least one arcuate cooling channel extending at least partially through the metal bond abrasive article precursor.

Features and advantages of the present disclosure will be further understood upon consideration of the detailed description as well as the appended claims.

Figure 1A:
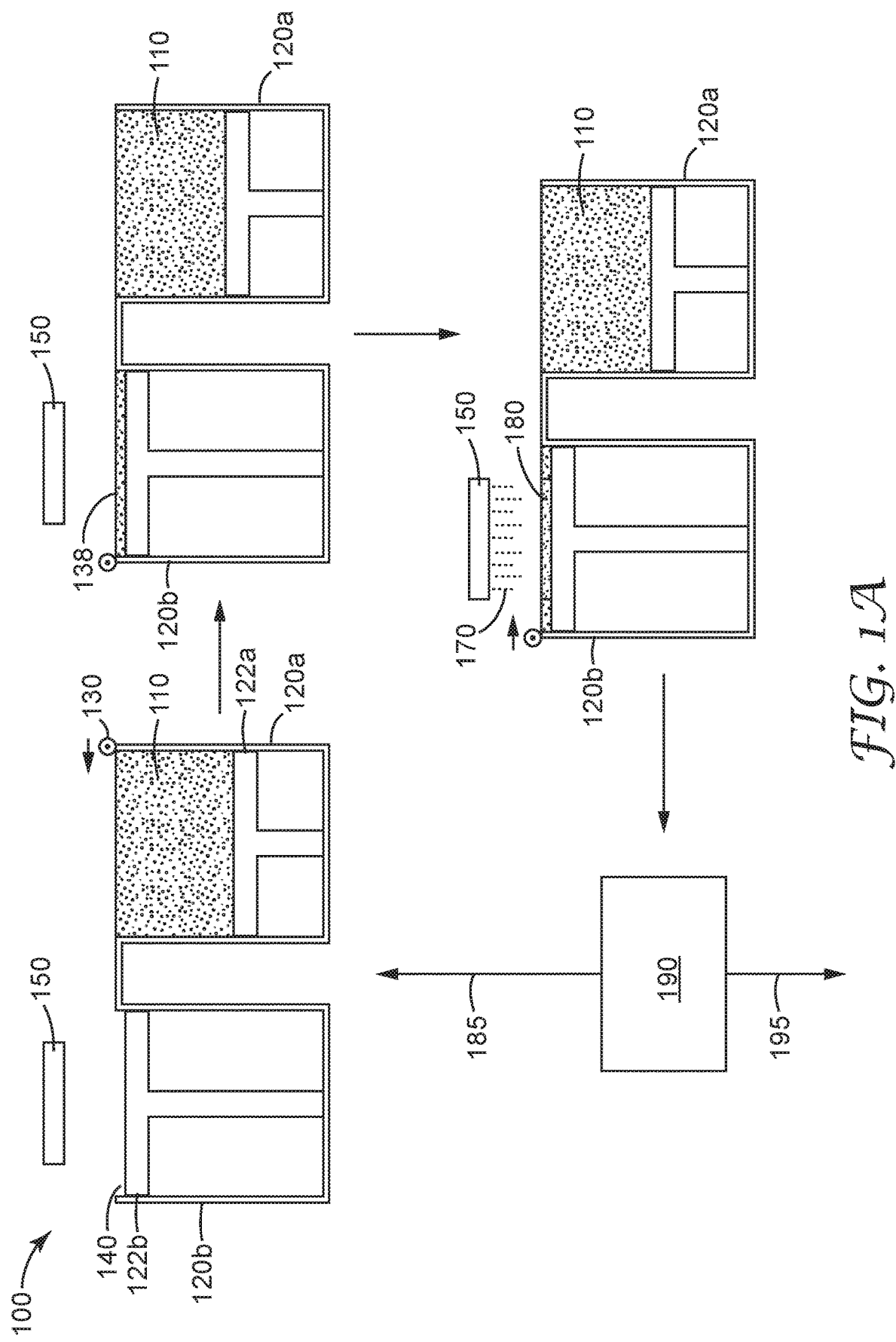
FIG. 1A is a schematic process flow diagram of a method of making a vitreous bond or metal bond abrasive article according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Methods of making vitreous bond abrasive articles and metal bond abrasive articles according to the present disclosure include a common additive subprocess. The subprocess comprises sequentially, preferably consecutively (although not required), carrying out at least three steps. Advantageously, the methods involve selectively applying heat via conduction or irradiation without requiring any high powered equipment as the heat source and without the need for an inert atmosphere.

FIG. 1A schematically depicts an exemplary powder bed process 100 used in making a vitreous bond abrasive article or a metal bond abrasive article.

In the first step, a layer 138 of loose powder particles 110 from powder chamber 120a with movable piston 122a is deposited in a confined region 140 in powder chamber 120b with movable piston 122b. The layer 138 should be of substantially uniform thickness. For example, the thickness of the layer may vary less than 50 microns, preferably less than 30 microns, and more preferably less than 10 microns. The layers may have any thickness up to about 1 millimeter, as long as heat can bind all the loose powder where it is applied. Preferably, the thickness of the layer is from about 10 microns to about 500 microns, 10 microns to about 250 microns, more preferably about 50 microns to about 250 microns, and more preferably from about 100 microns to about 200 microns.

The abrasive particles may comprise any abrasive particle used in the abrasives industry. Preferably, the abrasive particles have a Mohs hardness of at least 4, preferably at least 5, more preferably at least 6, more preferably at least 7, more preferably at least 8, more preferably at least 8.5, and more preferably at least 9. In certain embodiments, the abrasive particles comprise superabrasive particles. As used herein, the term "superabrasive" refers to any abrasive particle having a hardness greater than or equal to that of silicon carbide (e.g., silicon carbide, boron carbide, cubic boron nitride, and diamond).

Specific examples of suitable abrasive materials include aluminum oxide (e.g., alpha alumina) materials (e.g., fused, heat-treated, ceramic, and/or sintered aluminum oxide materials), silicon carbide, titanium diboride, titanium nitride, boron carbide, tungsten carbide, titanium carbide, aluminum nitride, diamond, cubic boron nitride (CBN), garnet, fused alumina-zirconia, sol-gel derived abrasive particles, metal oxides such as cerium oxide, zirconium oxide, titanium oxide, and combinations thereof. In certain embodiments, the abrasive particles comprise metal oxide ceramic particles. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802

(Schwabel), U.S. Pat. No. 4,770,671 (Monroe et al.); and U.S. Pat. No. 4,881,951 (Monroe et al.). Agglomerate abrasive particles that comprise finer abrasive particles in a vitreous bond matrix (e.g., as described in U.S. Pat. No. 6,551,366 (D'Souza et al.)) may also be used.

As noted above, the loose powder particles include organic compound particles, which were discovered to be capable of holding together the abrasive particles (as well as other types of particles present in the loose powder particles) upon the select application of heat. In many embodiments, the organic compound particles have a melting point between 50 degrees Celsius and 250 degrees Celsius, inclusive, such as between 100 degrees Celsius to 180 degrees Celsius, inclusive. Stated another way, in certain embodiments, the organic compound particles have a melting point of at least 50 degrees Celsius, or at least 60, or at least 70, or at least 80, or at least 90, or at least 100, or at least 110, or at least 120, or at least 130 degrees Celsius; and a melting point of up to 250 degrees Celsius, or up to 240, or up to 230, or up to 220, or up to 210, or up to 200, or up to 190, or up to 180, or up to 170, or up to 160 degrees Celsius.

The organic compound particles are not particularly limited, and are optionally selected from waxes, sugars, dextrins, thermoplastics having a melting point of no greater than 250 degrees Celsius, acrylates, methacrylates, and combinations thereof.

Suitable waxes include for example and without limitation, materials of vegetable, animal, petroleum, and/or mineral derived origin. Representative waxes include carnauba wax, candelilla wax, oxidized Fischer-Tropsch wax, microcrystalline wax, lanolin, bayberry wax, palm kernel wax, mutton tallow wax, polyethylene wax, polyethylene copolymer wax, petroleum derived waxes, montan wax derivatives, polypropylene wax, oxidized polyethylene wax, and combinations thereof.

Suitable sugars include for example and without limitation, lactose, trehalose, glucose, sucrose, levulose, dextrose, and combinations thereof.

Suitable dextrins include for example and without limitation, gamma-cyclodextrin, alpha-cyclodextrin, beta-cyclodextrin, glucosyl-alpha-cyclodextrin, maltosyl-alpha-cyclodextrin, glucosyl-beta-cyclodextrin, maltosyl-beta-cyclodextrin, 2-hydroxy-beta-cyclodextrin, 2-hydroxypropyl-beta-cyclodextrin, 2-hydroxypropyl-gamma-cyclodextrin, hydroxyethyl-beta-cyclodextrin, methyl-beta-cyclodextrin, sulfobutylether-alpha-cyclodextrin, sulfobutylether-beta-cyclodextrin, sulfobutylether-gamma-cyclodextrin, and combinations thereof.

Suitable thermoplastics include for example and without limitation, thermoplastics having a melting point of no greater than 250 degrees Celsius, such as polyethyleneterephthalate (PET), polylactic acid (PLA), polyvinyl chloride (PVC), polymethyl methacrylate (PMMA), polypropylene (PP), bisphenol-A polycarbonate (BPA-PC), polysulfone (PSF), polyether imide (PEI), and combinations thereof.

Suitable acrylates and methacrylates include for example and without limitation, urethane acrylates, epoxy acrylates, polyester acrylates, acrylated (meth)acrylics, polyether acrylates, acrylated polyolefins, and combinations thereof, or their methacrylate analogs.

The organic compound particles are typically present in an amount of 2.5 weight percent to 30 weight percent of the loose powder particles, inclusive, such as 5 weight percent to 20 weight percent of the loose powder particles, inclusive. Stated another way, in certain embodiments the organic compound particles are present in an amount of at least 2.5 weight percent, or at least 3 weight percent, or at least 4 weight percent, or at least 5 weight percent, or at least 7 weight percent, or at least 8 weight percent, or at least 10 weight percent, or at least 12 weight percent of the loose powder particles; and up to 30 weight percent, or up to 28 weight percent, or up to 25 weight percent, or up to 23 weight percent, or up to 20 weight percent, or up to 18 weight percent of the loose powder particles. Typically, the average particle size of the organic compound particles ranges from about 1 micrometer to about 100 micrometers, preferably about 5 micrometers to about 50 micrometers, and most preferably about 10 micrometers to about 30 micrometers.

When forming a vitreous bond abrasive article, the loose powder particles comprise vitreous bond precursor particles, abrasive particles, and organic compound particles. When forming a metal bond abrasive article, the loose powder particles comprise metal particles, abrasive particles, and organic compound particles. In certain embodiments of forming a metal bond abrasive article, the metal particles comprise higher melting metal particles.

The vitreous bond precursor particles may comprise particles of any material that can be thermally converted into a vitreous material. Examples include glass frit particles, ceramic particles, ceramic precursor particles, and combinations thereof.

The vitreous bond which binds together the abrasive grain in accordance with this disclosure can be of any suitable composition which is known in the abrasives art. The vitreous bond phase, also variously known in the art as a "ceramic bond", "vitreous phase", "vitreous matrix", or "glass bond" (e.g., depending on the composition) may be produced from one or more oxide (e.g., a metal oxide and/or boria) and/or at least one silicate as frit (i.e., small particles), which upon being heated to a high temperature react to form an integral vitreous bond phase. Examples include glass particles (e.g., recycled glass frit, water glass frit), silica frit (e.g., sol-gel silica frit), alumina trihydrate particles, alumina particles, zirconia particles, and combinations thereof. Suitable frits, their sources and compositions are well known in the art.

Abrasive articles are typically prepared by forming a green structure comprised of abrasive grain, the vitreous bond precursor, an optional pore former, and a temporary binder. The green structure is then fired. The vitreous bond phase is usually produced in the firing step of the process for producing the abrasive article of this disclosure. Typical firing temperatures are in the range of from 540° C. to 1700° C. (1000° F. to 3100° F.). It should be understood that the temperature selected for the firing step and the composition of the vitreous bond phase must be chosen so as to not have a detrimental effect on the physical properties and/or composition of abrasive particles contained in the vitreous bond abrasive article.

Useful glass frit particles may include any glass frit material known for use in vitreous bond abrasive articles. Examples include glass frit selected from the group consisting of silica glass frit, silicate glass frit, borosilicate glass frit, and combinations thereof. In one embodiment, a typical vitreous binding material contains about 70-90% $SiO_2$+$B_2O_3$, 1-20% alkali oxides, 1-20% alkaline earth oxides, and 1-20% transition metal oxides. In another embodiment, the vitreous binding material has a composition of about 82 wt % $SiO_2$+$B_2O_3$, 5% alkali metal oxide, 5% transition series metal oxide, 4% $Al_2O_3$, and 4% alkaline earth oxide. In another embodiment, a frit having about 20% $B_2O_3$, 60% silica, 2% soda, and 4% magnesia may be utilized as the vitreous binding material. One of skill in the art will understand that the particular components and the amounts of those components can be chosen in part to provide particular properties of the final abrasive article formed from the composition.

The size of the glass frit can vary. For example, it may be the same size as the abrasive particles, or different. Typically, the average particle size of the glass frit ranges from about 0.01 micrometer to about 100 micrometers, preferably about 0.05 micrometer to about 50 micrometers, and most preferably about 0.1 micrometer to about 25 micrometers. The average particle size of the glass frit in relation to the average particle size of the abrasive particles having a Mohs hardness of at least about 4 can vary. Typically, the average particle size of the glass frit is about 1 to about 200 percent of the average particle size of the abrasive, preferably about 10 to about 100 percent, and most preferably about 15 to about 50 percent.

Typically, the weight ratio of vitreous bond precursor particles to abrasive particles in the loose powder particles ranges from about 10:90 to about 90:10. The shape of the vitreous bond precursor particles can also vary. Typically, they are irregular in shape (e.g., crushed and optionally graded), although this is not a requirement. For example, they may be spheroidal, cubic, or some other predetermined shape.

Preferably, the coefficient of thermal expansion of the vitreous bond precursor particles is the same or substantially the same as that of the abrasive particles.

One preferred vitreous bond has an oxide-based mole percent (%) composition of $SiO_2$ 63.28; $TiO_2$ 0.32; $Al_2O_3$ 10.99; $B_2O_3$ 5.11; $Fe_2O_3$ 0.13; $K_2O$ 3.81; $Na_2O$ 4.20; $Li_2O$ 4.98; CaO 3.88; MgO 3.04 and BaO 0.26. Firing of these ingredients is typically accomplished by raising the temperature from room temperature to the desired sintering temperature (e.g., 1149° C. (2100° F.)), over a prolonged period of time (e.g., about 25-26 hours), holding at the maximum temperature (e.g., for several hours), and then cooling the fired article to room temperature over an extended period of time (e.g., 25-30 hours).

It is known in the art to use various additives in the making of vitreous bonded abrasive articles both to assist in the making of the abrasive article and/or improve the performance of such articles. Such conventional additives which may also be used in the practice of this disclosure include but are not limited to lubricants, fillers, pore inducers, and processing aids. Examples of lubricants include, graphite, sulfur, polytetrafluoroethylene and molybdenum disulfide. Examples of pore inducers include glass bubbles and organic particles. Concentrations of the additives as are known in the art may be employed for the intended purpose of the additive, for example. Preferably, the additives have little or no adverse effect on abrasive particles employed in the practice of this disclosure.

The vitreous bond precursor particles may comprise ceramic particles. In such cases sintering and/or fusing of the ceramic particles forms the vitreous matrix. Any sinterable and/or fusible ceramic material may be used. Preferred ceramic materials include alumina, zirconia, and combinations thereof. The inorganic vitreous bond precursor optionally includes a precursor of alpha alumina. In certain embodiments, the abrasive particles and the vitreous bond material have the same chemical composition.

If desired, alpha-alumina ceramic particles may be modified with oxides of metals such as magnesium, nickel, zinc, yttria, rare earth oxides, zirconia, hafnium, chromium, or the like. Alumina and zirconia abrasive particles may be made by a sol-gel process, for example, as disclosed in U.S. Pat. No. 4,314,827 (Leitheiser et al.); U.S. Pat. No. 4,518,397 (Leitheiser et al.); U.S. Pat. No. 4,574,003 (Gerk); U.S. Pat. No. 4,623,364 (Cottringer et al.); U.S. Pat. No. 4,744,802 (Schwabel); and U.S. Pat. No. 5,551,963 (Larmie).

The vitreous bond precursor particles may be present in an amount from 10 to 40 volume percent of the combined volume of the vitreous bond precursor particles and abrasive particles, preferably from 15 to 35 volume percent of the abrasive composition.

In the case of the metal bond precursor particles, the optional higher melting metal particles may comprise any metal from group 2 through to group 15 of the Periodic Table of the elements, for example. Alloys of these metals, and optionally with one or more elements (e.g., metals and/or non-metals such as carbon, silicon, boron) in groups 1 and 15 of the Periodic Table, may also be used. Examples of suitable metal particles include powders comprising magnesium, aluminum, iron, titanium, niobium, tungsten, chromium, tantalum, cobalt, nickel, vanadium, zirconium, molybdenum, palladium, platinum, copper, silver, gold, cadmium, tin, indium, tantalum, zinc, alloys of any of the foregoing, and combinations thereof.

Higher melting metal particles preferably having a melting point of at least about 1100° C., and more preferably at least 1200° C., although lower melting metals may also be used. Examples include stainless steel (about 1360-1450° C.), nickel (1452° C.), steel (1371° C.), tungsten (3400° C.), chromium (1615° C.), Inconel (Ni+Cr+Fe, 1390-1425° C.), iron (1530° C.), manganese (1245-1260° C.), cobalt (1132° C.), molybdenum (2625° C.), Monel (Ni+Cu, 1300-1350° C.), niobium (2470° C.), titanium (1670° C.), vanadium (1900° C.), antimony (1167° C.), Nichrome (Ni+Cr, 1400° C.), alloys of the foregoing (optionally also including one or more of carbon, silicon, and boron), and combinations thereof. Combinations of two or more different higher melting metal particles may also be used.

The loose powder particles may optionally further comprise lower melting metal particles (e.g., braze particles). The lower melting metal particles preferably have a maximum melting point that is at least 50° C. lower (preferably at least 75° C. lower, at least 100° C., or even at least 150° C. lower) than the lowest melting point of the higher melting metal particles. As used herein, the term "melting point" includes all temperatures in a melting temperature range of a material. Examples of suitable lower melting metal particles include particles of metals such as aluminum (660° C.), indium (157° C.), brass (905-1083° C.), bronze (798-1083° C.), silver (961° C.), copper (1083° C.), gold (1064° C.), lead (327° C.), magnesium (671° C.), nickel (1452° C., if used in conjunction with higher melting point metals), zinc (419° C.), tin (232° C.), active metal brazes (e.g., InCuAg, TiCuAg, CuAg), alloys of the foregoing, and combinations thereof.

Typically, the weight ratio of high melting metal particles and/or optional lower melting metal particles to the abrasive particles ranges from about 10:90 to about 90:10, although this is not a requirement.

The loose powder particles may optionally further comprise other components such as, for example, pore inducers, fillers, and/or fluxing agent particles. Examples of pore inducers include glass bubbles and organic particles. In some embodiments, the lower melting metal particles may also serve as a fluxing agent; for example as described in U.S. Pat. No. 6,858,050 (Palmgren).

The loose powder particles may optionally be modified to improve their flowability and the uniformity of the layer spread. Methods of improving the powders include agglomeration, spray drying, gas or water atomization, flame forming, granulation, milling, and sieving. Additionally, flow agents such as, for example, fumed silica, nanosilica, stearates, and starch may optionally be added.

In order to achieve fine resolution, the loose powder particles are preferably sized (e.g., by screening) to have a maximum size of less than or equal to 400 microns, preferably less than or equal to 250 microns, more preferably less than or equal to 200 microns, more preferably less than or equal to 150 microns, less than or equal to 100 microns, or even less than or equal to 80 microns, although larger sizes may also be used. In certain embodiments, the loose powder particles have an average particle diameter of less than or equal to one micron (e.g., "submicron"); for example less than or equal to 500 nanometers (nm), or even less than or equal to 150 nm. The various components of the loose powder particles may have the same or different maximum particle sizes, $D_{90}$, $D_{50}$, and/or $D_{10}$ particle size distribution parameters.

Figure 1B:
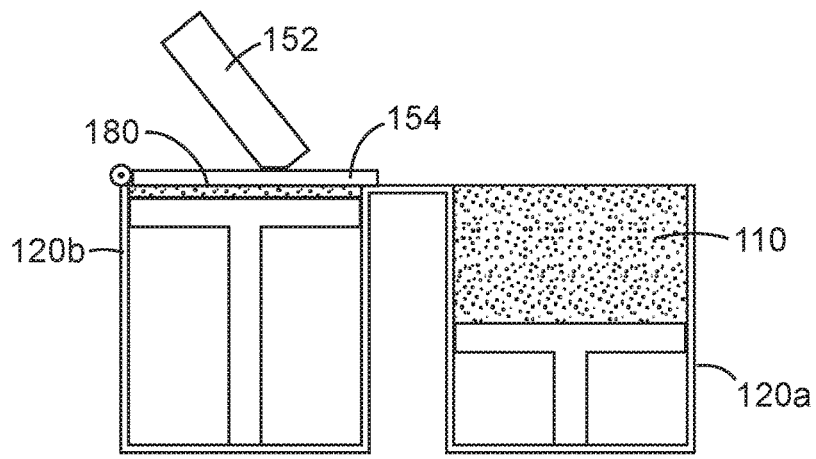
FIG. 1B is a schematic cross-sectional side view of the third step of the process of FIG. 1A with a thermal print head heat source.

Referring to FIG. 1A again, heat 170 is selectively applied via conduction or irradiation, to heat treat an (e.g., predetermined) area 180 of the layer 138. The source 150 of the heat is not particularly limited, and includes for instance and without limitation, a single source or a multipoint source. Suitable single point sources include for instance, a heated tip 156 and a laser 158. A heated tip typically includes a heated metal tip or a heated ceramic tip, such as a metal tip found on a common soldering tool. The skilled practitioner can select a suitable low powered laser, for instance, the CUBE 405-100C Diode Laser System from Coherent Inc. (Santa Clara, Calif.). Useful multipoint sources include a thermal print head, such as commonly used in direct thermal printing or thermal transfer printing, and two or more lasers. For instance, one suitable thermal print head is model KEE-57-24GAG4-STA, available from KYOCERA Corporation (Kyoto, Japan). Hence, referring to FIG. 1B, the third step of the process of FIG. 1A is shown with a thermal print head 152 heat source. A film 154 is disposed on the layer 138 to provide a barrier between the thermal print head 152 heat source and the area 180 of the layer 138. Suitable films include, for instance and without limitation, polyethylene terephthalate (PET), polyethylene naphthalate (PEN), polyimide, polytetrafluoroethylene (PTFE), perfluoroalkoxy (PFA), and other films known to be stable at high temperatures.

Figure 1C:
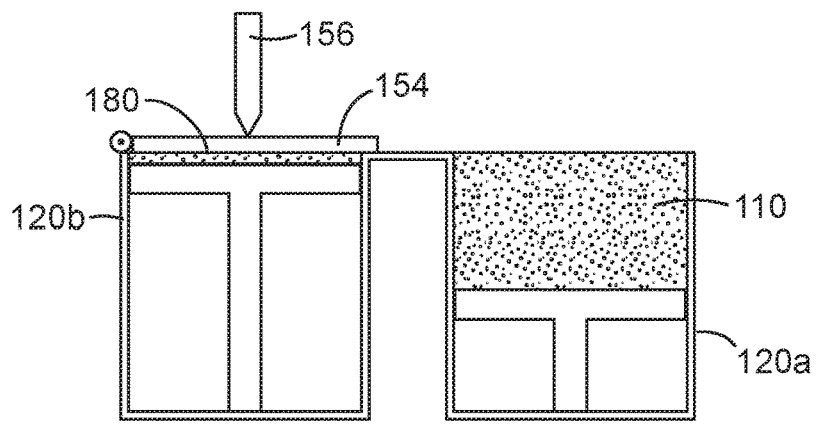
FIG. 1C is a schematic cross-sectional side view of the third step of the process of FIG. 1A with a heated tip heat source.
Figure 1D:
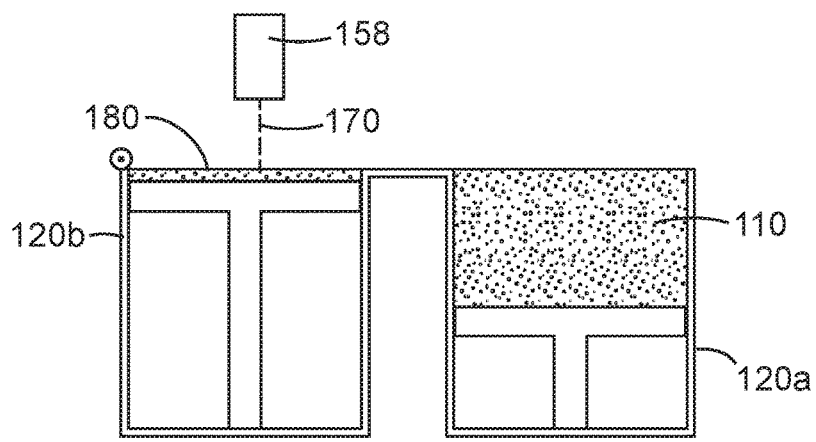
FIG. 1D is a schematic cross-sectional side view of the third step of the process of FIG. 1A with a laser heat source.

Referring to FIG. 1C, the third step of the process of FIG. 1A is shown with a single tip 156 heat source. A film 154 is disposed on the layer 138 to provide a barrier between the single tip 156 heat source and the area 180 of the layer 138. Referring now to FIG. 1D, the third step of the process of FIG. 1A is shown with a laser 158 heat source. FIG. 1D further includes the laser beam 170 being directed at the area 180 of the layer 138. No film is provided in this illustrated exemplary embodiment.

The heat softens and/or melts organic compound particles in the selected area 180 of the layer 138, to bond the loose powder particles together according to a predetermined pattern (and ultimate 3-D shape upon multiple repetitions). In certain embodiments in which the heat is applied using a single heated tip, the tip optionally further applies pressure to the (e.g., predetermined) area of the layer of loose powder particles. An advantage of applying pressure is that the pressure may be effective to densify the powder particles, especially when the loose powder particles contain a large amount of organic compound particles.

Referring again to FIG. 1A, the organic compound material bonds together the loose powder particles in at least one predetermined region (or area) of the loose powder particles to form a layer of bonded powder particles; for example, by softening and/or melting at least a portion of the organic compound particles.

The above steps are then repeated (step 185) with changes to the region where applying heat is carried out according to a predetermined design resulting through repetition, layer on layer, in a three-dimensional (3-D) abrasive article preform. In each repetition, the loose powder particles may be independently selected; that is, some or all of the loose powder particles may be the same as, or different from those in adjacent deposited layers.

The abrasive article preform comprises the bonded powder particles and remaining loose powder particles. Once sufficient repetitions have been carried out to form the abrasive article preform, it is preferably separated from substantially all (e.g., at least 85 percent, at least 90 percent, preferably at least 95 percent, and more preferably at least 99 percent) of the remaining loose powder particles, although this is not a requirement. In certain embodiments, at least a portion of the organic compound material is burned off (e.g., volatilizing and/or decomposing) following the separation of the bonded powder particles and prior to or concurrently with infusing with a metal.

If desired, multiple particle reservoirs each containing a different powder may be used. Likewise, multiple different organic compound particles may be used. This results in different powders/binders distributed in different and discrete regions of the abrasive article. For example, relatively inexpensive, but lower performing abrasive particles and/or vitreous bond precursor particles may be relegated to regions of a vitrified bond abrasive article where it is not particularly important to have high performance properties (e.g., in the interior away from the abrading surface). The same approach can apply to metal bond abrasive articles.

In another aspect, the present disclosure provides a vitreous bond abrasive article precursor. The vitreous bond abrasive article precursor comprises abrasive particles bonded together by a vitreous bond precursor material and an organic compound, wherein the vitreous bond abrasive article precursor further comprises at least one of: at least one tortuous cooling channel extending at least partially through the vitreous bond abrasive article precursor; or at least one arcuate cooling channel extending at least partially through the vitreous bond abrasive article precursor. The abrasive particles often include at least one of silicon carbide, boron carbide, silicon nitride, or metal oxide ceramic particles.

Generally, vitreous bond abrasive articles made in ways according to the present disclosure have considerable porosity throughout their volumes. Accordingly, the abrasive article preform may then be infused with a solution or dispersion of additional vitreous bond precursor material, or grain growth modifiers.

In embodiments in which the loose powder particles include higher melting metal particles and lower melting metal particles, the abrasive article preform may be heated sufficiently to cause the lower melting metal particles to soften/melt and bond to at least a portion of the loose powder particles, and then cooled to provide the metal bond abrasive article. In embodiments in which the loose powder particles include higher melting metal particles and no lower melting metal particles, the abrasive article preform may be heated sufficiently to cause the higher melting metal particles to at least sinter and bond to at least a portion of the loose powder particles, and then cooled to provide the metal bond abrasive article. Cooling may be accomplished by any means known to the art; for example cold quenching or air cooling to room temperature.

Metal bond abrasive articles and/or abrasive article preforms made according to the present disclosure may comprise a porous metal-containing matrix (e.g., which may comprise metal particles and abrasive particles, and which may be sintered) with considerable porosity throughout its volume, although this is not a requirement. For example, the porous metal-containing matrix may have a void fraction of 1 to 60 volume percent, preferably 5 to 50 volume percent, and more preferably 15 to 50 volume percent, more preferably 40 to 50 volume percent, although this is not a requirement. Accordingly, the abrasive article preform may then be infused with a molten metal that has a temperature below the melting point(s) of any other metallic components, then cooled. Examples of suitable metals that can be made molten and infused into the abrasive article preform include aluminum, indium, brass, bronze, silver, copper, gold, lead, cobalt, magnesium, nickel, zinc, tin, iron, chromium, silicon alloys, alloys of the foregoing, and combinations thereof.

Further details concerning sintering and then infusing with molten metal can be found in, for example, U.S. Pat. No. 2,367,404 (Kott) and U.S. Pat. Appln. Publ. No. 2002/095875 (D'Evelyn et al.).

Advantageously, methods according to the present disclosure are suitable for manufacturing various metal bond abrasive articles that cannot be readily or easily fabricated by other methods. For example, inclusion of internal voids is possible as long as an opening to the exterior of the abrasive preform exists for removal of unbonded loose powder. Accordingly, cooling channels having tortuous and or arcuate paths can be readily manufactured using methods of the present disclosure. Cooling channels are open to the exterior of the metal bond abrasive article. In some embodiments, they have a single opening, but more typically they have two or more openings. A cooling medium (e.g., air, water, emulsion, or oil) circulates through the cooling channel(s) to remove heat generated during the abrading process.

Accordingly, in another aspect, the present disclosure provides a metal bond abrasive article precursor comprising metallic particles and abrasive particles bonded together by an organic compound material, wherein the metal bond abrasive article precursor further comprises at least one of: at least one tortuous cooling channel extending at least partially through the metal bond abrasive article precursor; at least one arcuate cooling channel extending at least partially through the metal bond abrasive article precursor.

The abrasive article preform 190 is then heated (step 195 in FIG. 1A) to remove any organic compound material that may be present, and sinter the abrasive particles with the metal or vitreous bond precursor particles (e.g., by burning off the organic compound material), thereby providing the metal bond or vitreous bond abrasive article, respectively.

In certain embodiments, the vitreous bond or metal bond abrasive article is selected from the group consisting of a unitary structured abrasive disc, an abrasive grinding bit, abrasive segments, abrasive rims, shaped abrasive particles (e.g., triangular abrasive particles), and an abrasive wheel, as well as many hitherto unknown vitreous bond or metal bond abrasive articles. In some preferred embodiments, a metal bond abrasive article comprises at least a portion of a rotary dental tool (e.g., a dental drill bit, a dental bur, or a dental polishing tool).

Figure 2:
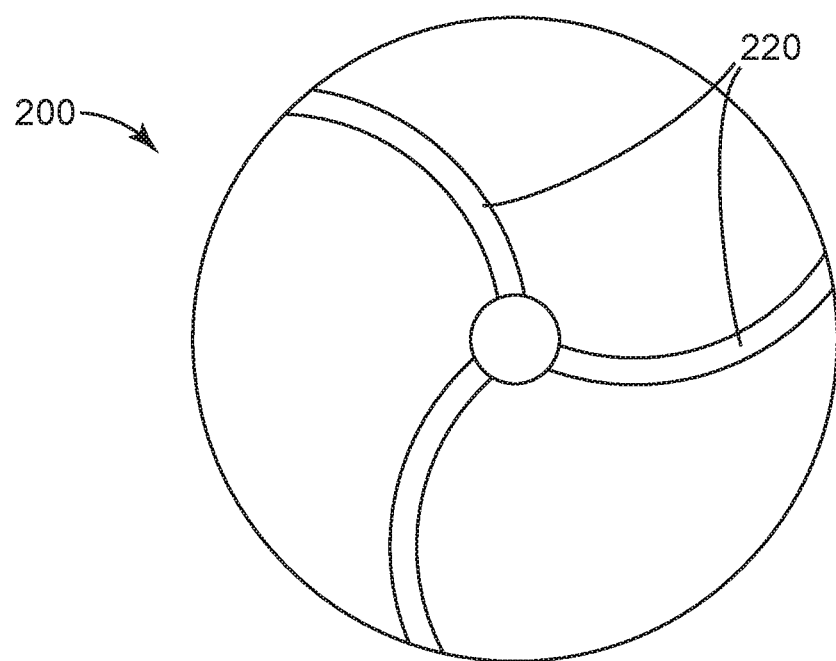
FIG. 2 is a schematic cross-sectional top view of an exemplary vitreous bond or metal bond abrasive wheel 200, preparable according to the present disclosure.

Referring now to FIG. 2, an exemplary vitreous bond or metal bond abrasive wheel 200 has arcuate and tortuous cooling channels 220, respectively.

Figure 3:
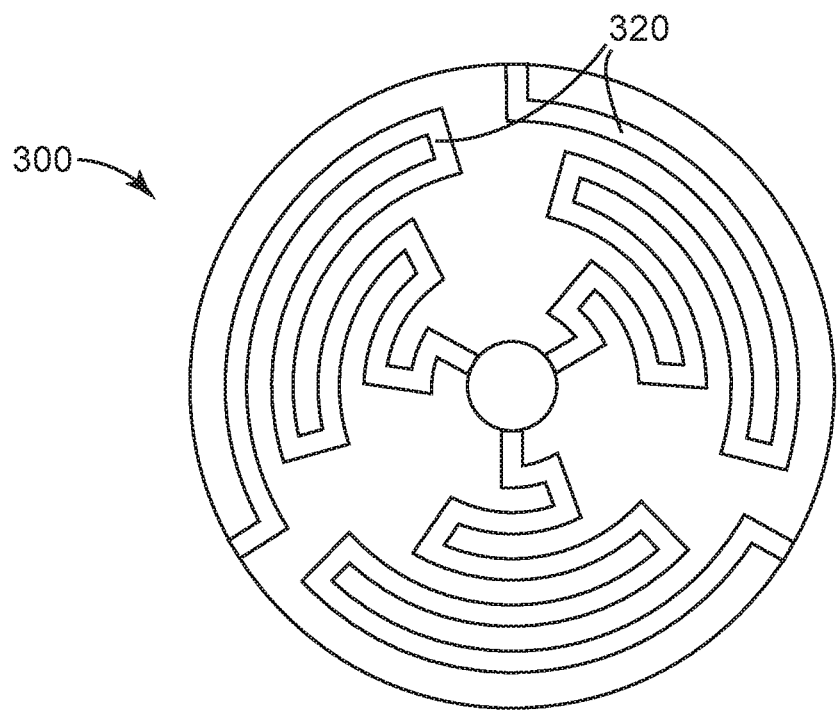
FIG. 3 is a schematic cross-sectional top view of an exemplary vitreous bond or metal bond abrasive wheel 300, preparable according to the present disclosure.

FIG. 3 shows another exemplary vitreous bond or metal bond abrasive wheel 300 that has tortuous cooling channels 320.

Figure 4:
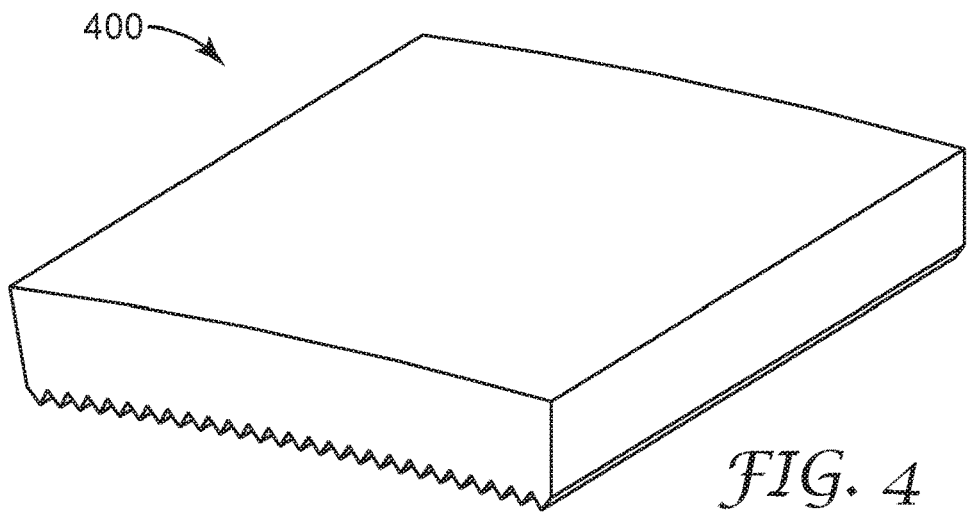
FIG. 4 is a schematic perspective view of an exemplary vitreous bond or metal bond abrasive segment 400, preparable according to the present disclosure.

FIG. 4 shows an exemplary vitreous bond or metal bond abrasive segment 400. In typical use, multiple vitreous bond or metal bond abrasive segments 400 are mounted evenly spaced along the circumference of a metal disc to form an abrasive wheel.

Figure 5:
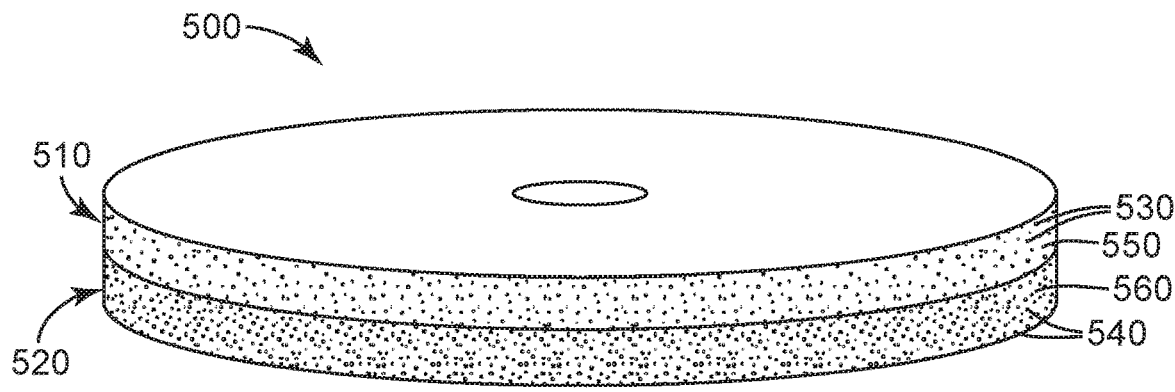
FIG. 5 is a schematic perspective view of a vitreous bond or metal bond abrasive wheel 500, preparable according to the present disclosure.
Figure 6A:
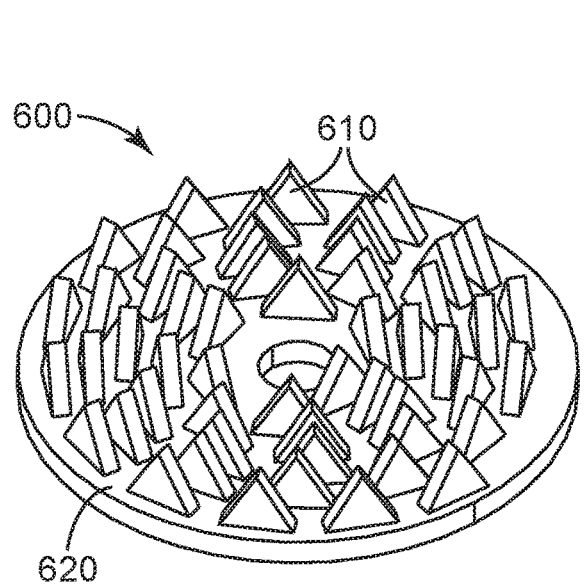
FIG. 6A is a schematic perspective view of a unitary structured abrasive disc 600, preparable according to the present disclosure.
Figure 6B:
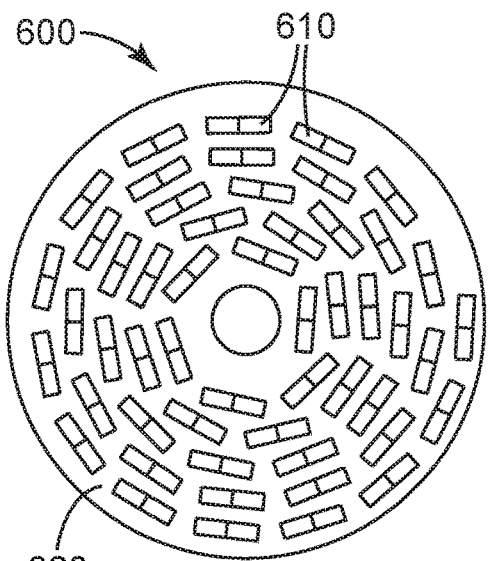
FIG. 6B is a schematic top view of unitary structured abrasive disc 600.
Figure 7A:
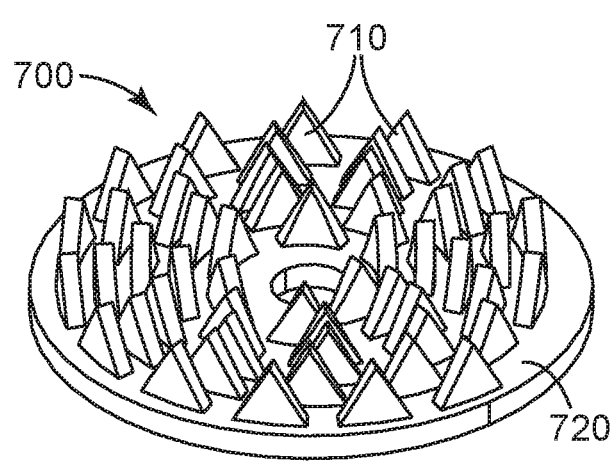
FIG. 7A is a schematic perspective view of a unitary structured abrasive disc 700, preparable according to the present disclosure.
Figure 7B:
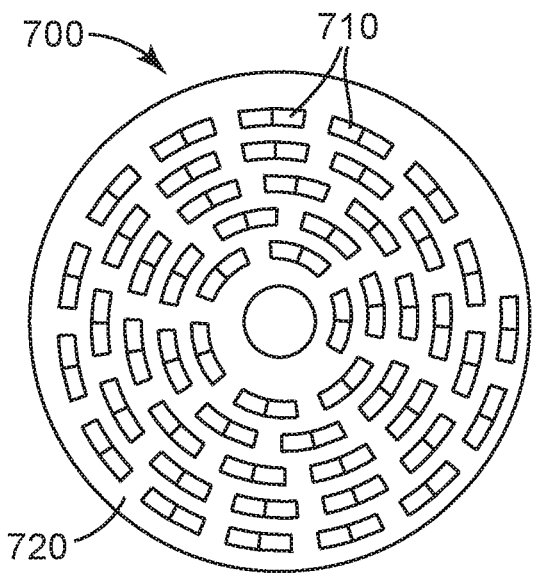
FIG. 7B is a schematic top view of unitary structured abrasive disc 700.

FIG. 5 shows a vitreous bond or metal bond abrasive disc 500 has two regions 510, 520. Each region has abrasive particles 530, 540 retained in a vitreous bond or metal bond matrix material 550, 560, respectively.

FIGS. 6A-6B and 7A-7B, respectively show various unitary structured abrasive discs with precisely-shaped ceramic abrasive elements 610, 710 formed integrally with ceramic planar bases 620, 720.

Figure 8:
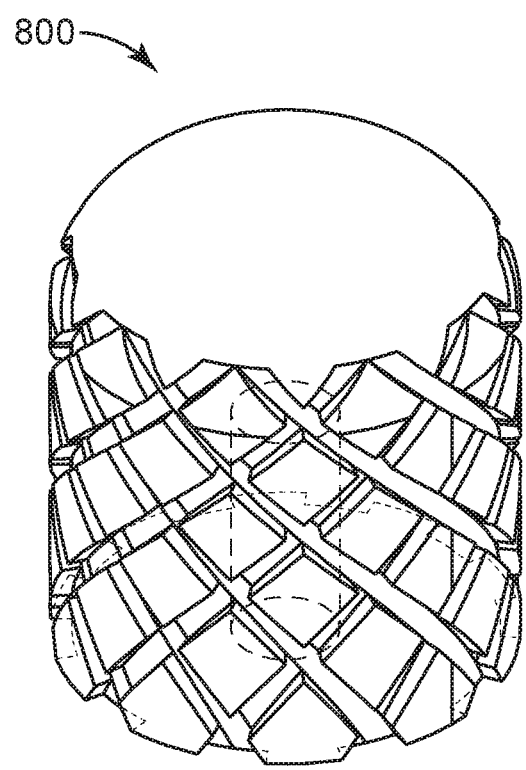
FIG. 8 is a schematic perspective view of rotary abrasive tool 800, preparable according to the present disclosure.

FIG. 8 shows a rotary abrasive tool 800 (a bit for a handheld motor driven shaft such as, for example, a Dremel tool).

Figure 9:
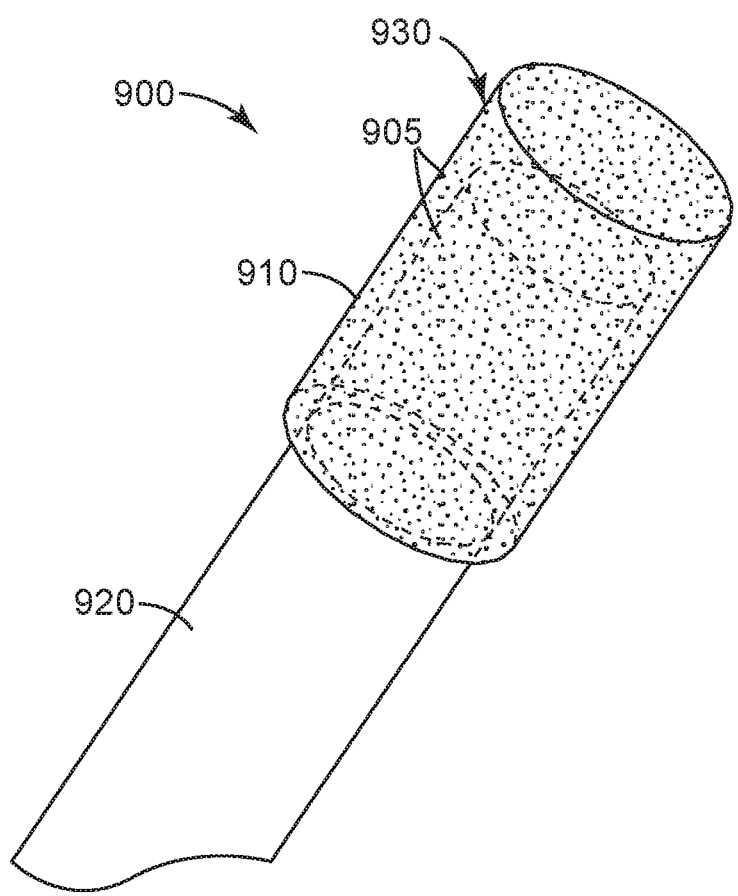
FIG. 9 is a schematic perspective view of an exemplary dental bur 900, preparable according to the present disclosure.

An exemplary dental bur 900 is shown in FIG. 9. Referring now to FIG. 9, dental bur 900 includes head 930 secured to shank 920. Dental bur 900 comprises abrasive particles 905 secured in porous metal bond or vitreous bond 910.

The foregoing abrasive wheels shown in FIGS. 2 and 3 can be prepared by firing corresponding green bodies (i.e., having the same general shape features, but comprising a vitreous bond or metal bond precursor particles held together by a temporary binder).

Select Embodiments of the Present Disclosure

Embodiment 1 is a method of making a vitreous bond abrasive article, the method comprising sequential steps:
  a) a subprocess comprising sequentially:
    i) depositing a layer of loose powder particles in a confined region, wherein the loose powder particles comprise vitreous bond precursor particles, abrasive particles, and organic compound particles, and wherein the layer of loose powder particles has substantially uniform thickness; and
    ii) selectively applying heat via conduction or irradiation, to heat treat an area of the layer of loose powder particles;
  b) independently carrying out step a) a plurality of times to generate an abrasive article preform comprising the bonded powder particles and remaining loose powder particles, wherein in each step a), the loose powder particles are independently selected;
  c) separating substantially all of the remaining loose powder particles from the abrasive article preform; and
  d) heating the abrasive article preform to provide the vitreous bond abrasive article comprising the abrasive particles retained in a vitreous bond material.

Embodiment 2 is the method of embodiment 1, wherein the abrasive particles include at least one of diamond particles or cubic boron nitride particles.

Embodiment 3 is the method of embodiment 1, wherein the abrasive particles include metal oxide ceramic particles.

Embodiment 4 is the method of any of embodiments 1 to 3, wherein the abrasive particles and the vitreous bond material have the same chemical composition.

Embodiment 5 is the method of any of embodiments 1 to 4, wherein the vitreous bond abrasive article includes at least one cooling channel.

Embodiment 6 is the method of any of embodiments 1 to 5, wherein the vitreous bond abrasive article is selected from the group consisting of a unitary structured abrasive disc, an abrasive grinding bit, abrasive segments, abrasive rims, and an abrasive wheel.

Embodiment 7 is the method of any of embodiments 1 to 6, wherein the organic compound particles have a melting point between 50 degrees Celsius and 250 degrees Celsius, inclusive.

Embodiment 8 is the method of any of embodiments 1 to 7, wherein the organic compound particles have a melting point between 100 degrees Celsius to 180 degrees Celsius, inclusive.

Embodiment 9 is the method of any of embodiments 1 to 8, wherein the organic compound particles are selected from waxes, sugars, dextrins, thermoplastics having a melting point of no greater than 250 degrees Celsius, acrylates, methacrylates, and combinations thereof.

Embodiment 10 is the method of any of embodiments 7 to 9, wherein the organic compound particles are selected from waxes, acrylates, methacrylates, polyethyleneterephthalate (PET), polylactic acid (PLA), and combinations thereof.

Embodiment 11 is the method of any of embodiments 1 to 10, wherein the organic compound particles are present in an amount of 2.5 weight percent to 30 weight percent of the loose powder particles.

Embodiment 12 is the method of any of embodiments 1 to 11, wherein the organic compound particles are present in an amount of 5 weight percent to 20 weight percent of the loose powder particles.

Embodiment 13 is the method of embodiment 11 or embodiment 12, wherein the inorganic vitreous bond precursor includes a precursor of alpha alumina.

Embodiment 14 is the method of any of embodiments 8 to 13, wherein the loose powder particles include submicron ceramic particles.

Embodiment 15 is the method of any of embodiments 1 to 14, wherein the loose powder particles further include flow agent particles.

Embodiment 16 is the method of any of embodiments 1 to 15, wherein step d) further includes burning out the organic compound material.

Embodiment 17 is the method of any of embodiments 1 to 16, wherein in step ii) the heat is applied using a single heated tip or a thermal print head.

Embodiment 18 is the method of claim 17, wherein in step ii) the single heated tip further applies pressure to the area of the layer of loose powder particles.

Embodiment 19 is the method of any of embodiments 1 to 16, wherein in step ii) the heat is applied using at least one laser.

Embodiment 20 is a vitreous bond abrasive article precursor including abrasive particles bonded together by a vitreous bond precursor material and an organic compound, wherein the vitreous bond abrasive article precursor further includes at least one of at least one tortuous cooling channel extending at least partially through the vitreous bond abrasive article precursor; or at least one arcuate cooling channel extending at least partially through the vitreous bond abrasive article precursor.

Embodiment 21 is the vitreous bond abrasive precursor of embodiment 20, wherein the abrasive particles include at least one of silicon carbide, boron carbide, silicon nitride, or metal oxide ceramic particles.

Embodiment 22 is a method of making a metal bond abrasive article, the method comprising sequential steps:

a) a subprocess comprising sequentially:
i) depositing a layer of loose powder particles in a confined region, wherein the loose powder particles comprise higher melting metal particles, abrasive particles, and organic compound particles, and wherein the layer of loose powder particles has substantially uniform thickness; and
ii) selectively applying heat via conduction or irradiation, to heat treat an area of the layer of loose powder particles;

b) independently carrying out step a) a plurality of times to generate an abrasive article preform comprising the bonded powder particles and remaining loose powder particles, wherein in each step a), the loose powder particles are independently selected;

c) separating substantially all of the remaining loose powder particles from the abrasive article preform;

d) infusing the abrasive article preform with a molten lower melting metal, wherein at least some of the higher melting metal particles do not completely melt when contacted by the molten lower melting metal; and e) solidifying the molten lower melting metal to provide the metal bond abrasive article.

Embodiment 23 is the method of embodiment 22, wherein the loose powder particles further include fluxing agent particles.

Embodiment 24 is the method of embodiment 22 or embodiment 23, wherein the abrasive particles include at least one of diamond particles or cubic boron nitride particles.

Embodiment 25 is the method of embodiment 22 or embodiment 23, wherein the abrasive particles include metal oxide ceramic particles.

Embodiment 26 is the method of any of embodiments 22 to 25, wherein the metal bond abrasive article includes at least one cooling channel.

Embodiment 27 is the method of any of embodiments 22 to 26, wherein the metal bond abrasive article is selected from the group consisting of an abrasive pad, an abrasive grinding bit, abrasive segments, and an abrasive wheel.

Embodiment 28 is the method of any of embodiments 22 to 26, wherein the metal bond abrasive article comprises at least a portion of a rotary dental tool.

Embodiment 29 is the method of any of embodiments 22 to 28, wherein the organic compound particles have a melting point between 50 degrees Celsius and 250 degrees Celsius, inclusive.

Embodiment 30 is the method of any of embodiments 22 to 29, wherein the organic compound particles have a melting point between 100 degrees Celsius to 180 degrees Celsius, inclusive.

Embodiment 31 is the method of any of embodiments 22 to 30, wherein the organic compound particles are selected from waxes, sugars, dextrins, thermoplastics having a melting point of no greater than 250 degrees Celsius, acrylates, methacrylates, and combinations thereof.

Embodiment 32 is the method of any of embodiments 29 to 31, wherein the organic compound particles are selected from waxes, acrylates, methacrylates, polyethyleneterephthalate (PET), polylactic acid (PLA), and combinations thereof.

Embodiment 33 is the method of any of embodiments 22 to 32, wherein the organic compound particles are present in an amount of 1.5 weight percent to 25 weight percent of the loose powder particles.

Embodiment 34 is the method of any of embodiments 22 to 33, wherein the organic compound particles are present in an amount of 3 weight percent to 20 weight percent of the loose powder particles.

Embodiment 35 is the method of any of embodiments 22 to 34, wherein the higher melting metal particles have a melting point that is at least 50 degrees Celsius higher than the temperature of the molten lower melting metal.

Embodiment 36 is the method of any of embodiments 22 to 35, further comprising, between steps c) and d), burning off at least a portion of the organic compound material.

Embodiment 37 is the method of any of embodiments 22 to 36, wherein in step ii) the heat is applied using a single heated tip or a thermal print head.

Embodiment 38 is the method of embodiment 37, wherein in step ii) the single heated tip further applies pressure to the area of the layer of loose powder particles.

Embodiment 39 is the method of any of embodiments 22 to 36, wherein in step ii) the heat is applied using at least one laser.

Embodiment 40 is a method of making a metal bond abrasive article, the method comprising sequential steps:
  a) a subprocess comprising sequentially:
    i) depositing a layer of loose powder particles in a confined region, wherein the loose powder particles comprise metal particles, abrasive particles, and organic compound particles, and wherein the layer of loose powder particles has substantially uniform thickness;
    ii) selectively applying heat via conduction or irradiation, to heat treat an area of the layer of loose powder particles;
  b) independently carrying out step a) a plurality of times to generate an abrasive article preform comprising the bonded powder particles and remaining loose powder particles, wherein the abrasive article preform has a predetermined shape, and wherein in each step a), the loose powder particles are independently selected;
  c) separating substantially all of the remaining loose powder particles from the abrasive article preform; and
  d) heating the abrasive article preform to provide the metal bond abrasive article.

Embodiment 41 is the method of embodiment 40, wherein the loose powder particles further include fluxing agent particles.

Embodiment 42 is the method of embodiment 40 or embodiment 41, wherein the abrasive particles include at least one of diamond particles or cubic boron nitride particles.

Embodiment 43 is the method of embodiment 40 or embodiment 41, wherein the abrasive particles include metal oxide ceramic particles.

Embodiment 44 is the method of any of embodiments 40 to 43, wherein the metal particles include a combination of higher melting metal particles and lower melting metal particles, wherein the higher melting metal particles have a melting point that is at least 50 degrees Celsius higher than the temperature of the molten lower temperature metal.

Embodiment 45 is the method of any of embodiments 40 to 44, wherein the metal bond abrasive article includes at least one cooling channel.

Embodiment 46 is the method of any of embodiments 40 to 45, wherein the metal bond abrasive article is selected from the group consisting of an abrasive pad, an abrasive grinding bit, abrasive segments, and an abrasive wheel.

Embodiment 47 is the method of any of embodiments 40 to 45, wherein the metal bond abrasive article includes at least a portion of a rotary dental tool.

Embodiment 48 is the method of any of embodiments 40 to 47, wherein the organic compound particles have a melting point between 50 degrees Celsius and 250 degrees Celsius, inclusive.

Embodiment 49 is the method of any of embodiments 40 to 48, wherein the organic compound particles have a melting point between 100 degrees Celsius to 180 degrees Celsius, inclusive.

Embodiment 50 is the method of any of embodiments 40 to 49, wherein the organic compound particles are selected from waxes, sugars, dextrins, thermoplastics having a melting point of no greater than 250 degrees Celsius, acrylates, methacrylates, and combinations thereof.

Embodiment 51 is the method of any of embodiments 48 to 50, wherein the organic compound particles are selected from waxes, acrylates, methacrylates, polyethyleneterephthalate (PET), polylactic acid (PLA), and combinations thereof.

Embodiment 52 is the method of any of embodiments 40 to 51, wherein the organic compound particles are present in an amount of 1.5 weight percent to 25 weight percent of the loose powder particles.

Embodiment 53 is the method of any of embodiments 40 to 52, wherein the organic compound particles are present in an amount of 3 weight percent to 20 weight percent of the loose powder particles.

Embodiment 54 is the method of any of embodiments 40 to 53, wherein in step ii) the heat is applied using a single heated tip or a thermal print head.

Embodiment 55 is the method of embodiment 54, wherein in step ii) the single heated tip further applies pressure to the area of the layer of loose powder particles.

Embodiment 56 is the method of any of embodiments 40 to 53, wherein in step ii) the heat is applied using at least one laser.

Embodiment 57 is a metal bond abrasive article precursor including metallic particles and abrasive particles bonded together by an organic compound material, wherein the metal bond abrasive article precursor further includes at least one of: at least one tortuous cooling channel extending at least partially through the metal bond abrasive article precursor; and at least one arcuate cooling channel extending at least partially through the metal bond abrasive article precursor.

EXAMPLES

Unless otherwise noted, all parts, percentages, ratios, etc. in the Examples and the rest of the specification are by weight.

TABLE 1

| ABBREVIATION | DESCRIPTION |
| --- | --- |
| PDR1 | ALODUR BFRPL aluminium oxide particles, grade P320, from Treibacher Schleifmittel AG (Villach, Austria) |
| PDR2 | A mix of 98.5% vitrified bond VO82069 from Reimbold & Strick, Cologne, Germany and 1.5% color stain for glazes K90084 from Reimbold & Strick (Cologne, Germany) |
| PDR3 | MicroKlear 116, a micronized blend of polyethylene and carnauba wax, particle size of 4.5 to 5.5 micron, maximum particle size 15.6 micron, melting point |

TABLE 1-continued

| ABBREVIATION | DESCRIPTION |
| --- | --- |
| PDR4 | 248-257 degree F., from Micro Powders, Inc. (Tarrytown, New York)<br>MicroPro 400, a micronized polypropylene wax, particle size of 5.0 to 7.0 micron, maximum particle size 22 micron, melting point 284-289 degrees Fahrenheit (140-143 degrees Celsius), from Micro Powders, Inc. (Tarrytown, New York) |

Example 1

A print material P1 was prepared by mixing, based on the mixture weight, 77.3 wt. % of PDR1, 13.6 wt. % of PDR2, and 9.1 wt. % of PDR3. The powder mixture was put in glass jar and rotated on a rolling bank mixer at about 50 rpm for 15 minutes. The print material was spread on a piece of paper using a straight metal blade, and one sheet of paper was used as a shim and the thickness of the resulting first powder layer was approximately 100 microns. It was covered with a 2 mil (50.8 micrometers) thick PET film. A soldering iron was heated to approximately 425° F. (~218° C.), and the hot tip was slowly moved over a predetermined approximately 1 centimeter (cm)×1 cm area. Only slight pressure was applied and the PET film was barely deformed. Then the PET film was removed, and it was observed that the print material P1 had turned from slightly grey to dark grey in the area where the heated tip had touched the PET film. Using a second layer of paper as a shim, a second 0.1 millimeter (mm) thick layer of print material was spread on top of the first layer of print material. It was again covered with the PET film, and the same 1 cm×1 cm area was heated with the tip of the soldering iron again. The procedure then was repeated for a third layer. After the PET film was removed, a solid object was extracted from the loose powder. It was observed that the three layers had melted together to form a green body. The green body then was placed into a furnace and burned out at 400° C. for 2 hours, followed by sintering at 700° C. for 4 hours, resulting in an abrasive square that measured approximately 1 cm×1 cm and 0.3 mm in thickness.

Example 2

Experimental Apparatus and Preparations

A laser marking device was assembled, consisting of a CO2 laser, Model E-400, available from Coherent, Santa Clara, Calif., and a 3-Axis Modular Scanner, Model HPLK 1330-17, CO2 30MM, available from GSI Group, Inc, Billerica, Mass. The device was controlled by a computer running the WaveRunner Advanced Laser Scanning Software, Version 3.3.5 build-0200, by Nutfield Technology, Hudson, N.H.

In the WaveRunner scanning software program, a 1.5 cm square shape was drawn in the approximate center of the scanning field. The "Hatch" function was enabled within the program and used to cross-hatch the square. The first hatch pattern was at an angle of 0 degrees, and the second hatch pattern was at an angle of 90 degrees. In both hatch patterns, the lines were set at a distance of 0.5 mm apart. Only the hatch patterns were marked; the contour of the shape was not.

The laser scanning conditions were set in WaveRunner as follows: Speed 2000 mm/second, Power: 8%, Frequency 20 kHz. A power setting of 8% equals a laser beam power of 27.8 Watts.

Experimental Procedure

Two sheets of paper were put down in the laser scanning area of the laser marking device. On top of the paper, the print material P1 was spread using a straight metal blade, and two sheets of paper, layered on top of each other, were used as a shim and the thickness of the resulting first powder layer was approximately 200 microns. This first powder layer then was marked with the laser scanner, using the conditions described above. It was observed that the print material P1 had turned from slightly grey to dark grey in the area where the laser had marked the layer. A second and a third layer of print material P1, each 200 micron in thickness, were subsequently put down and marked the same way. Finally, a fourth layer was put down on the previous three layers, and this final layer was marked with two passes of the laser.

A solid object was extracted from the loose powder. It was observed that the four layers had melted together and formed a green body that could be safely handled without breaking apart. The green body then was placed into a furnace and burned out at 400° C. for 2 hours, followed by sintering at 700° C. for 4 hours, resulting in an abrasive square that measured approximately 1.5 cm×1.5 cm and 0.8 mm in thickness.

Example 3

Experimental Apparatus and Preparations

An apparatus for 3D printing with powders was constructed as generally depicted in FIG. 1. Two adjacent chambers, each measuring about 3 inches×2 inches (7.62 cm×5.08 cm) in the xy plane and 2 inches (5.08 cm) in the z-direction, were milled into a 2 inch (5.08 cm) thick aluminum block. Two tightly fitting square pistons made from aluminum were inserted into the chambers and connected to stepper motor linear actuators, VersaDrive 17, Model USV17-110-AB-0506, with a 6 inch (15.24) long lead screw, available from USAutomation, Mission Viejo, Calif. One chamber and piston was designated the powder supply, the other was designated the build chamber. The linear actuators allow the pistons to be moved up and down in z-direction. A rotating aluminum roller, driven by a motor, was mounted in the plane about 1 mm above the chambers. This roller was actuated in x-direction using a stepper motor linear actuator, VersaDrive 17, Model USV17-110-AB-2512, with a 12 inch (30.48 cm) long lead screw, available from USAutomation, Mission Viejo, Calif. This actuated roller allows movement of powder from the powder supply chamber to the build chamber.

The motors were connected to a motion controller board, model EZ4AXIS, available from AllMotion, Union City, Calif. The motion controller was programmed to run the following sequence: First, lower the build piston by 0.10 mm, then raise the powder supply piston by 0.16 mm, then switch on the roller motor, actuate the roller to move powder from the powder supply chamber to the build chamber, stop the roller motor, and return the roller to the origin. This procedure produces a uniform, 0.1 mm thick layer of powder in the build area. Above the two chamber assembly, a motorized xy positioning stage was mounted, and a 500 mW, 405 nm diode laser, model M-33A405-500-G, available from TEM-Laser, Wuhan, Hubei, China, was attached. The xy table contained a Grbl controller board for laser engravers and was able to be controlled by Grbl 0.9, an open source software for controlling the motion of machines. The graphics were loaded into Inkscape 0.48 with a laser engraver plug-in, an open source graphics software. This software generated the xy motion control and the laser power code from a drawing, and transferred it to the Grbl 0.9 software.

A print material P2 was prepared by mixing, based on the mixture weight, 77.3 wt. % of PDR1, 13.6 wt. % of PDR2 and 9.1 wt. % of PDR4. The powder mixture was put in a glass jar and rotated on a rolling bank mixer at about 50 rpm for 15 minutes. The powder supply piston was lowered to the bottom, and the chamber was filled with the print material P2. The build piston was raised to the top. Then the powder spreading procedure was executed 10 times to form a uniform powder base in the build area.

In the Inkscape software, the font Arial, font size 14 pt, was selected, and the word "Test" was written. Then the laser engraver plug-in was selected. The laser was set to 100% output, and a motion speed of 10 mm/second was selected, and the Grbl code was generated and transferred to the Grbl 0.9 software. Then a first 0.1 mm thick layer of print material P2 was spread. Next, the Grbl code was executed. It was observed that the laser turned on and moved in the shape of the word "Test", and the powder turned from a light grey to a dark grey in the shape of the word "Test".

A second layer, also 0.1 mm thick, of print material P2 was spread, and the Grbl code was executed a second time. This sequence was repeated until a total of 20 layers had been spread and exposed to the laser.

Then a spatula was used to remove the object from the surrounding powder. Loose powder was removed and an object in the shape of the word "Test", 2.05 mm in thickness, was recovered.

It was observed that the 20 layers had melted together and formed a green body that could be safely handled without breaking apart. The green body was placed into a furnace and burned out at 400° C. for 2 hours, followed by sintering at 700° C. for 4 hours, resulting in an abrasive article in the shape of the word "Test". The article was rubbed against a block of aluminum, and an abrasion pattern was observed.

What is claimed is:

1. A method of making a vitreous bond abrasive article, the method comprising sequential steps:
    a) a subprocess comprising sequentially:
        i) depositing a layer of loose powder particles in a confined region, wherein the loose powder particles comprise vitreous bond precursor particles, abrasive particles, and organic compound particles, and wherein the layer of loose powder particles has substantially uniform thickness; and
        ii) selectively applying heat to an area of the layer of loose particles, the heat being applied via conduction or irradiation, wherein the heat is sufficient to cause the organic compound particles to form a temporary bond;
    b) independently carrying out step a) a plurality of times to generate an abrasive article preform comprising the bonded powder particles and remaining loose powder particles, wherein in each step a), the loose powder particles are independently selected;
    c) separating substantially all of the remaining loose powder particles from the abrasive article preform, wherein the abrasive article preform comprises temporarily bonded powder particles in the area of each layer that received heat; and
    d) heating the abrasive article preform to provide the vitreous bond abrasive article, the vitreous bond abrasive article comprising the abrasive particles retained in a vitreous bond material.

2. The method of claim 1, wherein the abrasive particles comprise at least one of diamond particles or cubic boron nitride particles.

3. The method of claim 1, wherein the abrasive particles comprise metal oxide ceramic particles.

4. The method of claim 1, wherein the vitreous bond abrasive article includes at least one cooling channel.

5. The method of claim 1, wherein the vitreous bond abrasive article is selected from the group consisting of a unitary structured abrasive disc, an abrasive grinding bit, abrasive segments, abrasive rims, an abrasive wheel, and a rotary dental tool.

6. The method of claim 1, wherein the organic compound particles have a melting point between 50 degrees Celsius and 250 degrees Celsius, inclusive.

7. The method of claim 1, wherein the organic compound particles are selected from waxes, sugars, dextrins, thermoplastics having a melting point of no greater than 250 degrees Celsius, acrylates, methacrylates, and combinations thereof.

8. The method of claim 1, wherein the organic compound particles are present in an amount of 2.5 weight percent to 30 weight percent of the loose powder particles.

9. The method of claim 1, wherein step d) further comprises burning out the organic compound material.

10. The method of claim 1, wherein in step ii) the heat is applied using a single tip.

* * * * *